United States Patent
Oelbermann

[11] Patent Number: 5,480,543
[45] Date of Patent: Jan. 2, 1996

[54] DEVICE ON FILTER PRESSES FOR MOVING THE FILTER PLATE WHICH IS THE FOREMOST AT THE TIME

[75] Inventor: Max Oelbermann, Remscheid, Germany

[73] Assignee: Rittershaus & Blecher GmbH, Wuppertal, Germany

[21] Appl. No.: 205,160

[22] Filed: Mar. 3, 1994

[30] Foreign Application Priority Data

Mar. 5, 1993 [DE] Germany .......................... 43 06 959.2
May 29, 1993 [DE] Germany .......................... 43 18 009.4

[51] Int. Cl.⁶ .................................................. B01D 25/172
[52] U.S. Cl. .......................... 210/230; 210/236; 100/199
[58] Field of Search .................................. 210/230, 236; 100/199

[56] References Cited

FOREIGN PATENT DOCUMENTS

| | | |
|---|---|---|
| 1919471 | 4/1969 | Germany . |
| 2923864 | 6/1979 | Germany . |
| 2015364 | 3/1979 | United Kingdom . |
| 2047109 | 3/1980 | United Kingdom . |
| 2052289 | 6/1980 | United Kingdom . |
| 2101003 | 6/1981 | United Kingdom . |

*Primary Examiner*—Matthew O. Savage
*Attorney, Agent, or Firm*—Antonelli, Terry, Stout & Kraus

[57] ABSTRACT

A filter plate transport device for filter presses has a slide block which can selectively move first and second directions opposite to each other along guide rails by a cable line. The slide block supports a driving pawl which engages behind a pillow block of a from filter plate in a filter plate stack each time the slide block moves in the second direction, and a drop lever is pointed towards the from filter plate each time the slide block moves in the second direction. To increase functional reliability, on the slide block, a control lever is supported which grips under the drop lever and which can be pivoted by the cable line around a horizontal axle between two stops on the slide block. The control lever, reverses the drop lever and driving pawl, which rests on it between a first position during plate transport and an second position during movement in the second direction of the slide block. The driving pawl and the drop lever mesh with a dynamic path of the filter plates when in the second position.

9 Claims, 5 Drawing Sheets

DEVICE ON FILTER PRESSES FOR MOVING THE FILTER PLATE WHICH IS THE FOREMOST AT THE TIME

FIELD OF THE INVENTION

The invention relates to a device on filter presses for moving a front filter plate of a stack of filter plates which are suspended on upper guide rails, with a slide block being movable in a forward and rear direction along guide rails by a cable line, wherein the slide block supports a driving pawl engageable behind the from filter plate each time the slide block moves rearwardly and a drop lever which is pointed towards the front filter plate each time the slide block moves backwards, the drop lever gripping under a stop of the driving pawl with its movable lever end.

BACKGROUND TO THE INVENTION

In, for example, DE 29 23 864 C2 a filter plate transport device is proposed wherein a driving pawl assumes the same level when the slide block moves rearwardly, i.e. during plate transport, as when the slide block moves forwardly to retrieve the next plate. When the slide block moves in a forward direction, especially during withdrawal of the front filter plate for purposes of discarding the cake, large forces must often be exerted by the driving pawl on the filter plate.

To transmit these large forces and to prevent the driving pawl from becoming disengaged during plate transport, the driving pawl must grip relatively low under the filter plate thereby resulting in the pawl, formed as a feed ramp on its lower side, when retrieving the next filter plate, traversing a relatively wide swivel or pivotal path to catch the filter plate at the top. For this reason, in the above described proposed device, the speed of reverse motion which could inherently be executed much more quickly than idling motion is limited.

Additionally, in the proposed device there are separate ramps at the two ends of the filter press frame to reverse the driving pawl and the drop lever into a position such that the slide block can be moved into its safekeeping or locking position on the filter press frame. Movement into the safekeeping position is moreover only possible there when first all filter plates of the stack have been moved to the stack of filter plates which is being newly formed.

In, for example, DE-AS 1 288 073 a filter plate transport device is also proposed wherein, in the filter plate stack, each filter plate is locked by a locking pawl to the following filter plate. The transport device comprises a plain coil chain which circles in only one direction, with a number of driving pawls being provided thereon, of which the driving pawl which has reached the foremost filter plate first releases its locking pawl each time and then transports the filter plate to the stack of filter plates being newly formed. This known device is very expensive due to the provision of many driving pawls and is not suited for use in filter presses, in which the individual filter plates must be guided into a special filter plate wash position and must be held securely at such position.

SUMMARY OF THE INVENTION

The aim underlying the present invention is to reduce wear loads in a filter plate transport device and to increase functional reliability so that working speed can be increased.

According to the invention, a control lever supported on a slide block grips under a drop lever and can be swivelled or pivoted around a horizontal axle between two stops on a carriage by a cable line. A control lever reverses the drop lever and the driving pawl which rests on it between a down position during plate transport and an up position during reverse motion of the slide block, for which even in the up position the driving pawl and the drop lever still mesh with the dynamic path or the path of movement taken by the filter plates.

A slide block is moved in a forward and rearward direction along guide rails by a cable line with the slide block supporting a driving pawl which engages behind a front filter plate in a filter plate stack. This contact occurs each time the slide block moves in the rearward direction with a drop lever extending from it of the front filter plate. The drop lever grips under a stop on the driving pawl and has a movable lever end. A slide block control lever grips under the drop lever and can be pivoted by the cable line around a horizontal axle disposed between two stops on cheeks of the slide block. The slide block, control lever reverses the drop lever and the driving pawl resting thereon between a down position during plate transport and an up position during movement of the slide block in the rearward direction. The dynamic path of the filter plate in the up position meshes with the driving pawl and drop lever.

In the invention, the drop lever may be adapted to feed against a filter plate stack being newly formed during plate transport and raise the driving pawl resting thereon in a topmost position, when the driving pawl is located above the dynamic path of a filter plate. Also the invention may have each filter plate locked by a locking pawl which locks a following filter plate with the locking pawl of the filter plate which is foremost filter plate being unlocked by the driving pawl. The stops on the cheeks of the slide block and a stop on the driving pawl on the drop lever can be adjusted. The brakes for the slide block on the slide rails may also have adjustable brakes. The driving pawl may be loaded by a spring in a direction towards the drop lever. There may be two identical control levers, which may be connected by a cross bar, enclosing a drop lever between themselves and griping under a cam projecting from the drop lever with an offset arm. The cable line may be also be connected to the center of the cross bar and to an overload safeguard with an undriven deflection pulley for the cable line, which is loaded by a spring and is responsive to cable line tension.

By virtue of the above mentioned features it is ensured that the driving pawl grips low behind the filter plate during transport and that, when the slide block moves backward or rearward, the driving pawl is moved forward into an up position, such that, when the next filter plate to be gripped is engaged at the top, the pawl is swivelled or pivoted only by a relatively short overhead engagement height. When, after the driving pawl catches, the direction of the cable line is reversed, the control lever immediately releases the drop lever and the driving pawl so that they drop into the down contact position which they maintain during plate transport. Reversals of the driving pawl and drop lever take place in the invention with extremely high functional reliability and within extremely short times. At the same time wear stress is greatly reduced in the device according to the invention.

According to further features of the invention, the drop lever which feeds against the filter plate stack which is being newly formed during plate transport raises the driving pawl which rests on it into a topmost position in which the driving pawl is above the dynamic path of the filter plates. This makes it possible to interrupt the rearrangement of the filter plates at any time and to move the slide block together with the drop lever and driving pawl into the safekeeping position. The driving pawl is shifted into the topmost position solely by parts located on the slide block and the stack of filter plates which is being newly formed, so that special control devices attached to the filter press frame are no longer necessary for this purpose.

Advantageously, according to still further features of the invention, in the filter plate stack, each filter plate is locked to the following filter plate by a locking pawl and the locking pawl of the filter plate which is foremost at the time can be unlocked by the driving pawl. In order to enable the driving pawl and drop lever to reliably execute their various functions, the stops on the slide block for the control lever and the stop on the driving pawl for the drop lever can be adjusted. Thus, the relative position of the driving pawl and drop lever as well as their common up position, their common down position and their crossing position for crossing the entire stack of filter plates with consideration of the unlocking work still to be carried out by the driving pawl can be matched to construction tolerances.

Other features of the invention are indicated in the disclosure and are detailed in conjunction with the description of the accompanying drawings.

DESCRIPTION OF THE PREFERRED EMBODIMENT

Figure 1:
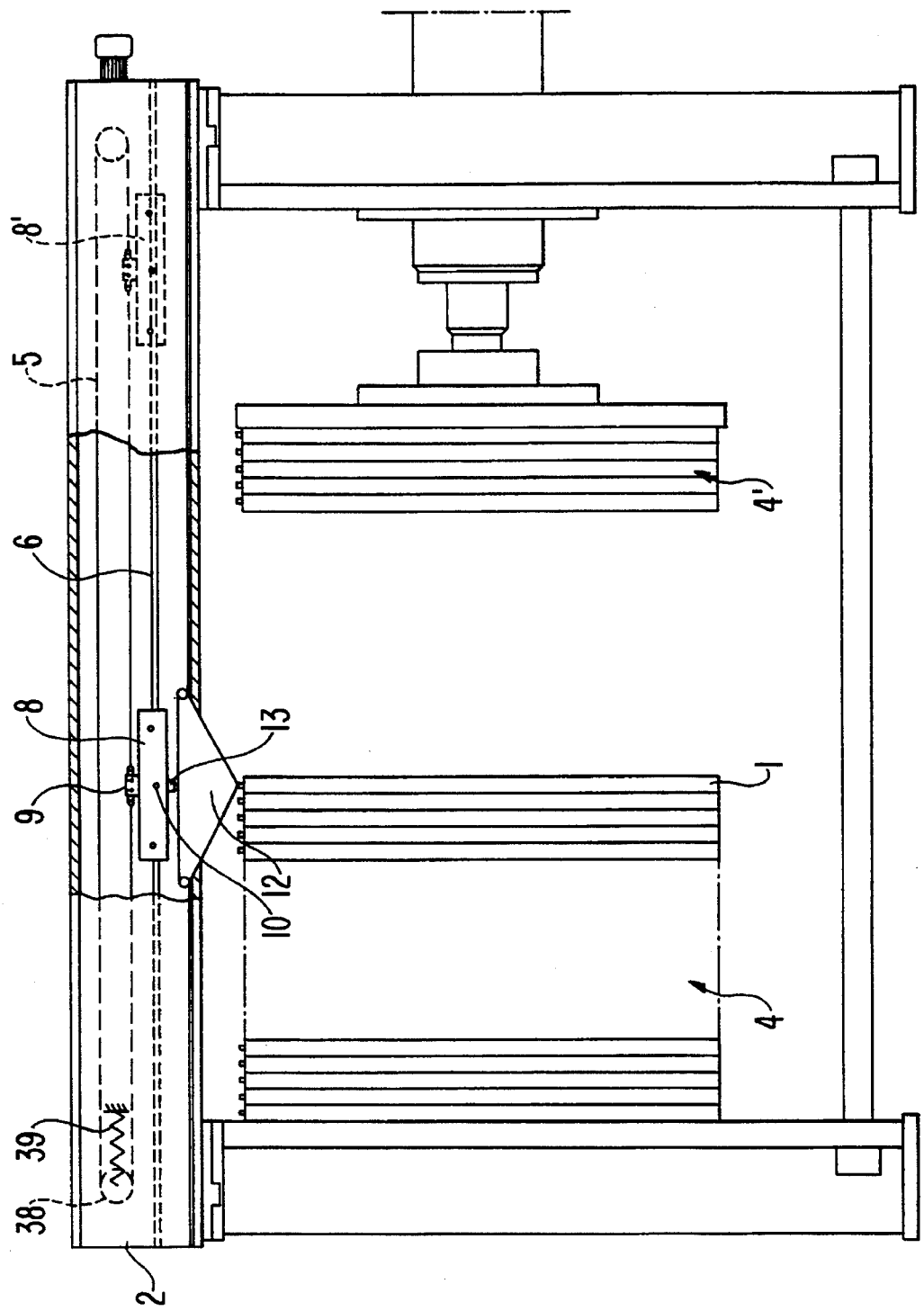
FIG. 1 is a schematic view of a filter press equipped with a filter plate transport device according to the invention.

The filter press is provided with a device for moving, generally for purposes of discarding the filter cake or for washing, the front filter plate 1 in a filter plate stack 4 suspended on upper guide rails 2,3. The transport device has slide block 8 movable forwardly and rearwardly on slide rails 6,7 by a peripheral cable line 5 along guide rails 2, 3. A control lever 9 is mounted on slide block 8 so as to be pivotable around a horizontal axle 10 with the cable line 5 being connected on both sides to control lever arm 11 pointed upwards. All filter plates are equipped with a pillow block 13 (FIG. 4) on the top side of their suspension bracket 12. A locking pawl 14 (FIG. 5) is mounted on the pillow block 13 so as to be pivotable around a horizontal axis 15 which grips behind pillow block 13 of the following adjacent filter plate by a pawl projection 16, so that the filter plates of the filter plate stack are completely interlocked.

Figure 2:
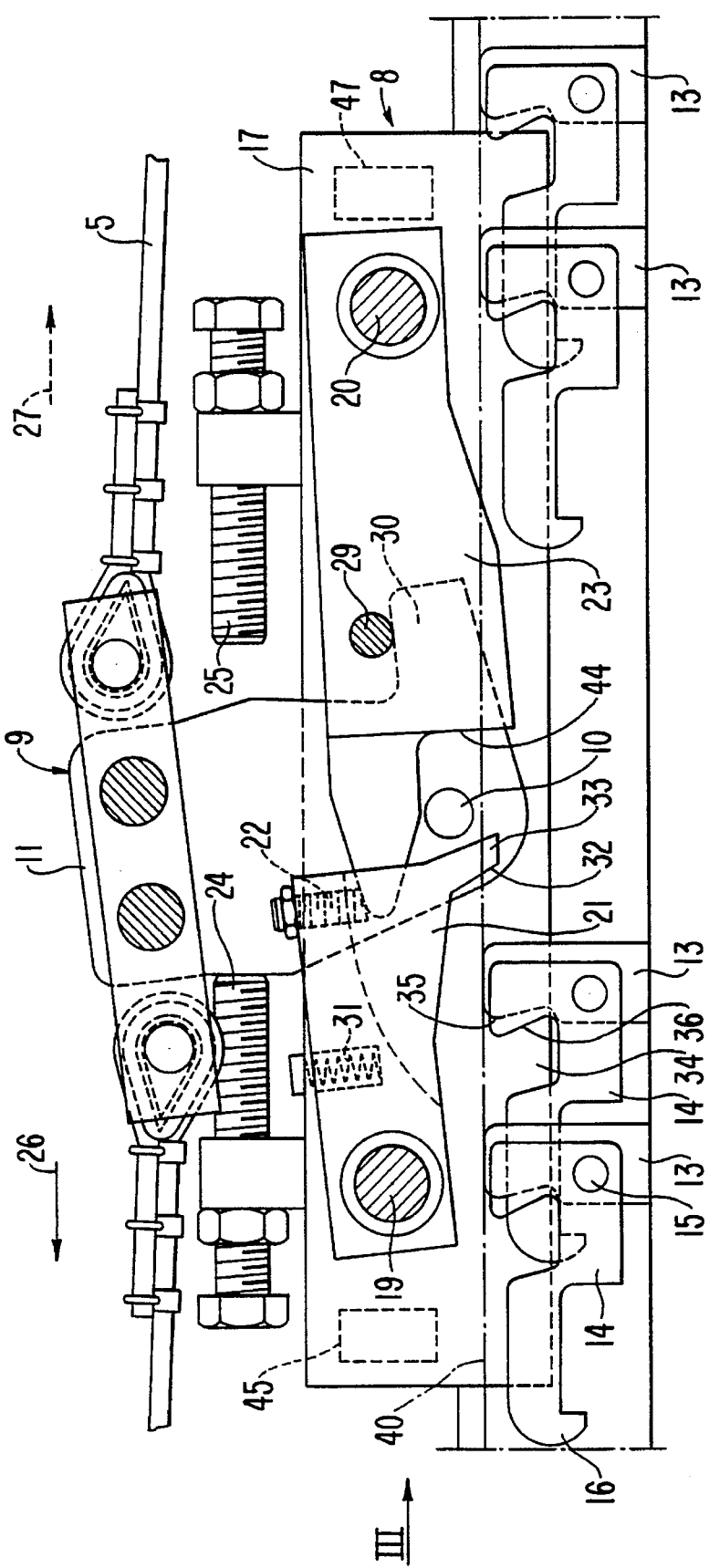
FIG. 2 is a cross-sectional view of the transport device of the present invention taken along the line II—II in FIG. 3.
Figure 3:
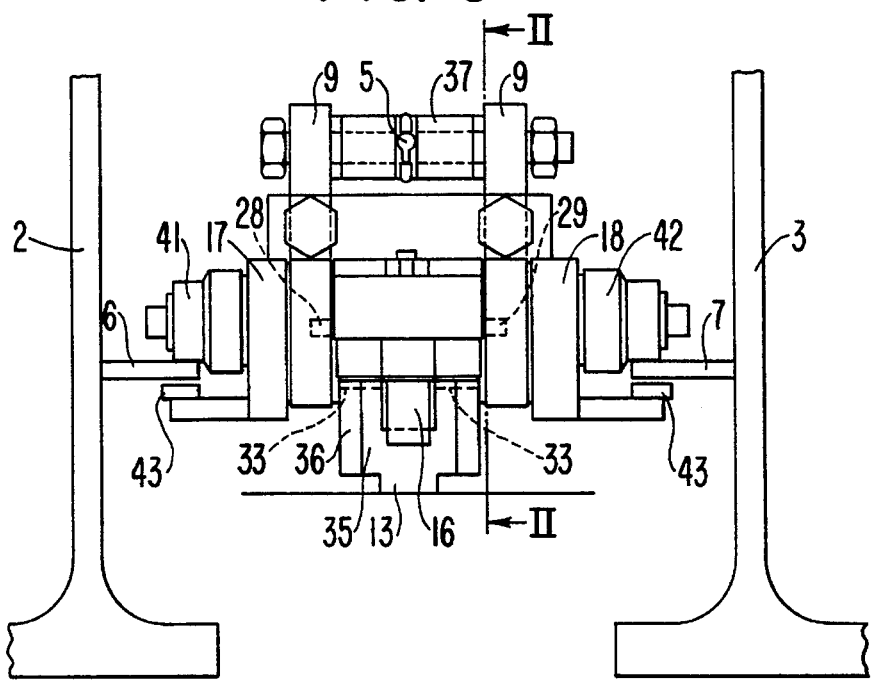
FIG. 3 shows a front view of the transport device of the present invention taken in the direction of the arrow III in FIG. 2.

As apparent from FIGS. 2 and 3, the slide block 8 surrounds two lateral cheeks 17, 18 which are rigidly interconnected by bolts 19, 20 (FIG. 2). A driving pawl 21 (FIG. 2) is supported on the bolt 19, with the driving pawl 21 resting on a stop 22 provided on a forward projection of a drop lever 23 which is pivotally mounted around the bolt 20. The stop 22 is designed as an adjustable screw. The control lever 9 can swivel or pivot between the slide block-side stops 24, 25 which are likewise fashioned with adjusting screws. In the position shown in FIG. 2 in which cable line 5 is pointed at reverse motion of slide block 8 in the direction of arrow 26, control lever 9 rests on stop 24. When the direction of the cable line 5 is reversed in the direction of arrow 27 shown, the control lever 9 swivels or pivots against the stop 25. On either side, the drop lever 23 is provided with projecting cams 28, 29 which rest on offset arm 30 of doubled control levers 9 (FIG. 3) which enclose drop lever 23 between themselves.

In the illustrated embodiment, the driving pawl 21 is loaded by compression spring 31 supported on the slide block 8 and normally rests on the drop lever 23.

In the position illustrated in FIG. 2, the driving pawl 21 is in its up position with its forked pawl projections 33, provided with feed ramp 32, projecting into a path of movement or dynamic path 40 of the filter plates or their pillow blocks 13. As slide block 8 moves rearward in the direction of arrow 26, a pawl projection 33, catching over the pillow block 13 of the front filter plate 1, reaches a catch seating space 34 and grips behind pillow block 13 and pawl 14.

Figure 4:
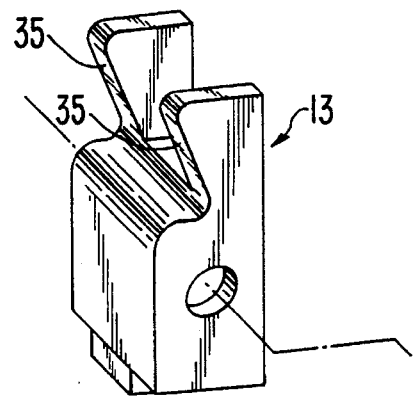
FIG. 4 is a perspective view of a pillow block on the filter plate side which is engaged by the transport device.
Figure 5:
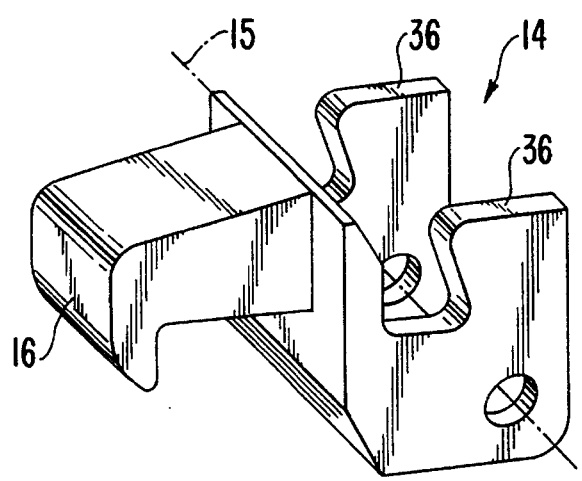
FIG. 5 is a perspective view of a locking pawl for locking the successive filter plates in the filter plate stack.

As shown in FIGS. 4 and 5, the pillow block 13 is forked into two stop cheeks 35. Likewise, the locking pawl 14 is forked on its bearing end into two control cheeks 36 which enclose pillow block 13 between themselves. When the pawl 14 is in the locking position, control cheeks 36 are disposed somewhat forwardly of the stop cheeks 35 of the pillow block 13 so that the forked pawl projections 33 first swivel or pivot the locking pawl 14 into an unlocking position before they strike stop cheeks 35 of pillow block 13 and withdraw the front filter plate of the filter plate stack. This type of filter plate locking and unlocking by a driving pawl are are described in detail in, for example, in DE-AS 1 288 073.

The two control levers 9 are connected by a cross bar 37 on which a cable line 5 is connected in the center. The cable 5 has an overload safeguard for its undriven deflection pulley 38 which is loaded by a spring 39 to determine the tension in the cable line. As apparent from FIG. 3, the slide block 8 is guided in a tilt-proof manner on the slide rails 6, 7 which are each enclosed between wheels 41, 42 and adjustable brakes 43.

Figure 6:
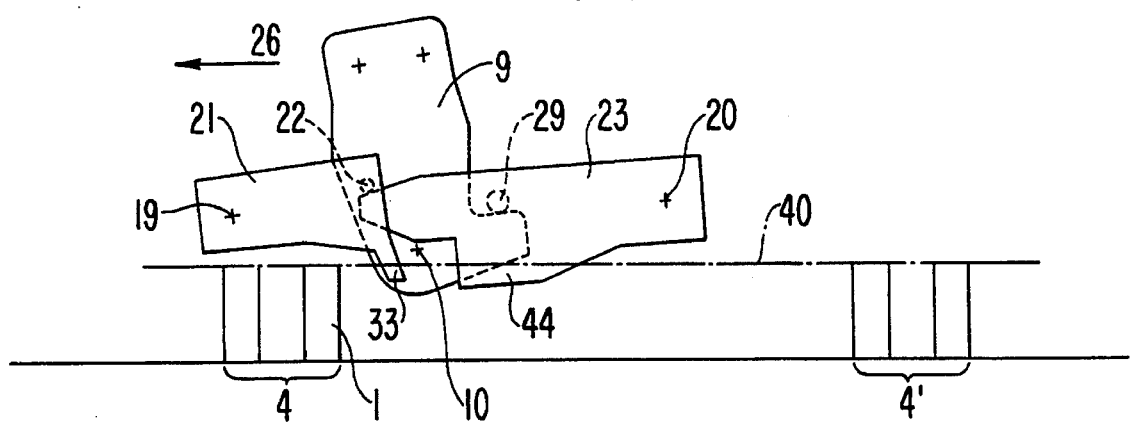
FIGS. 6–12 are schematic views of seven different positions of the transport device in the present invention.

FIG. 6 schematically illustrates the transport device in the position shown in FIG. 2, in which slide block 8 moves rearwardly in the direction of arrow 26 to retrieve the next filter plate 1 from the filter plate stack 4. Drop lever 23 and driving pawl 21 are in their up position and pawl projection 33 and stop projection 44 provided on drop lever 23 still project into dynamic path 40 of the filter plates. At the end of rearward motion, the driving pawl 21 rises into an overhead catch position and then drops into catch seating space 34.

Figure 7:
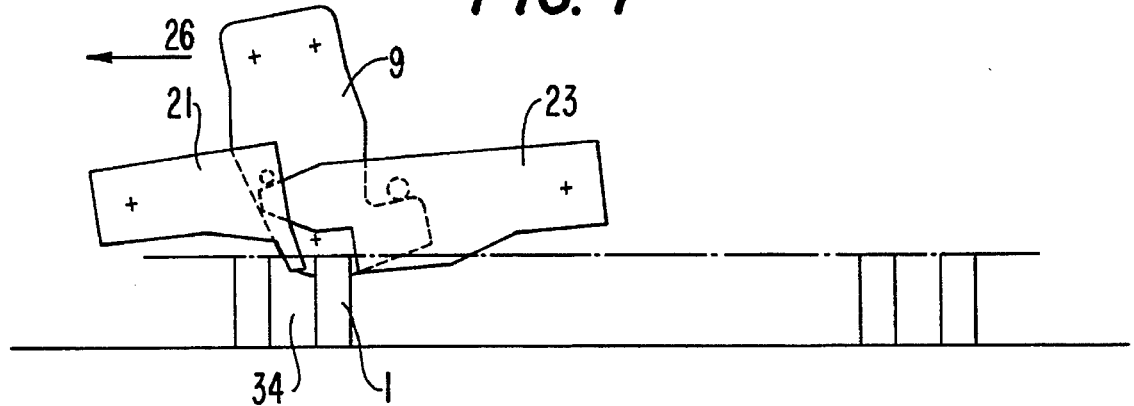
Figure 8:
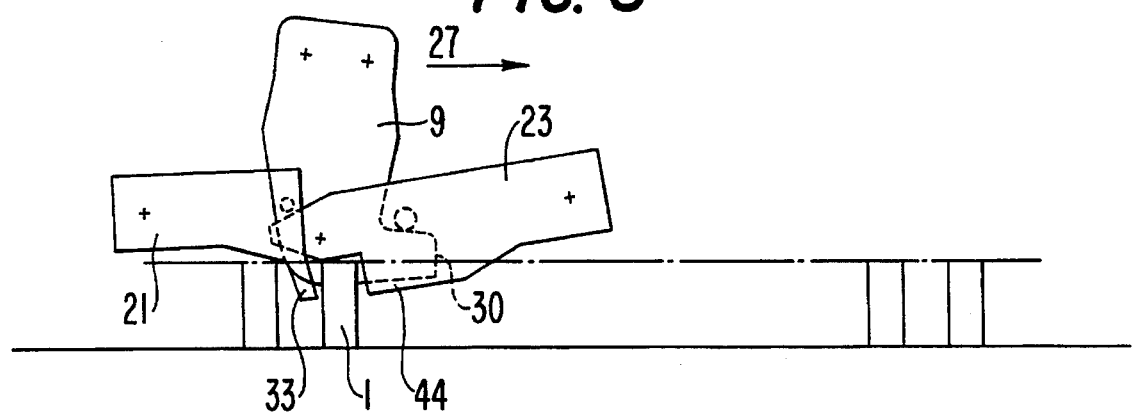
Figure 9:
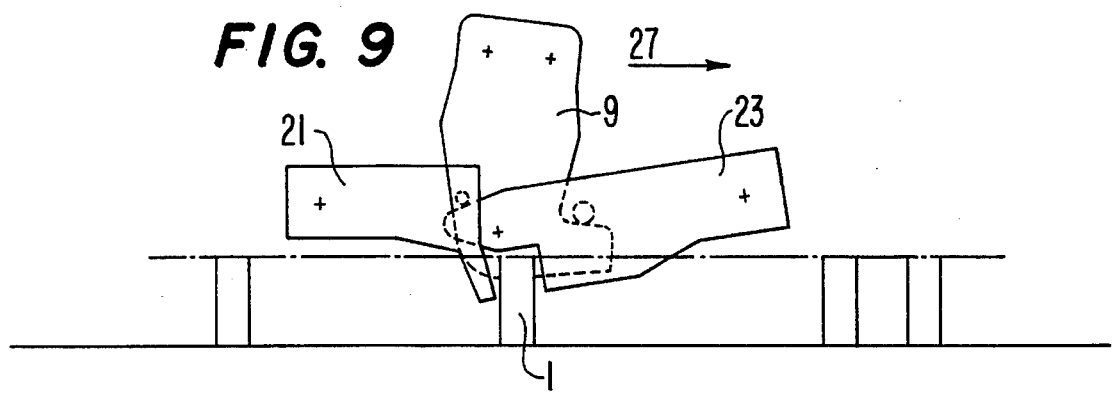
Figure 10:
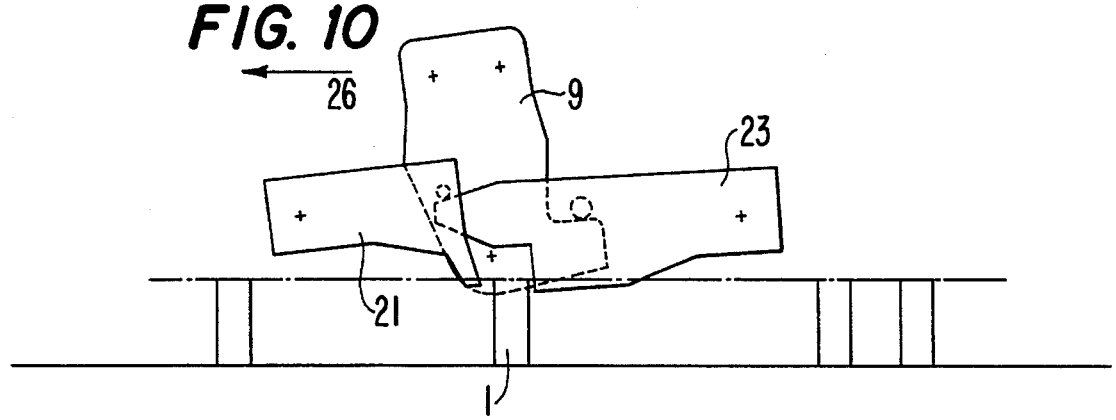
Figure 11:
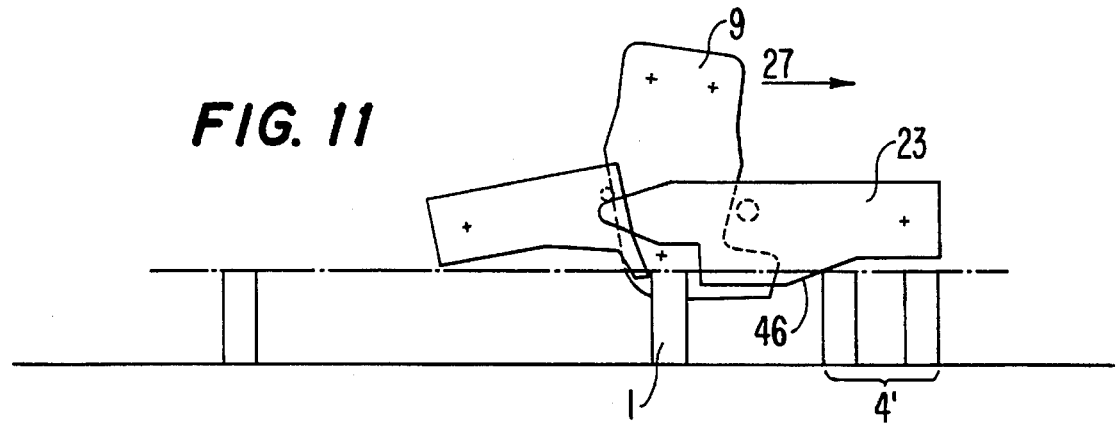

The slide block moves rearwardly by proximity switch 45 (FIG. 2) and stopped in the position shown in FIG. 7. When the direction of the cable line 5 is switched in the direction of arrow 27 (FIG. 8), the control lever 9 is immediately swivelled or pivoted into its other stop position and its offset arm 30 is swivelled or pivoted downwardly so that the drop lever 23 and the driving pawl 21 drop into their downward position shown in FIG. 8. The projections 33, 44 grip low behind filter plate 1 or its pillow block 13 providing a depth of engagement several times greater than the upward position. During subsequent plate transport this deep engagement is preserved (FIG. 9). If the filter plate must be stopped in an intermediate position, for example, for a washing process, the cable line 5 is disengaged. For purposes of fine positioning, as pointed again in the direction of arrow 26, the driving pawl 21 and drop lever 23 again assume the upward position by the reversing control lever 9 (FIG. 10). In the upward position the driving pawl 21 and the drop lever 23 enclose filter plate 1 on both sides and prevent drifting from the set position as before.

Figure 12:
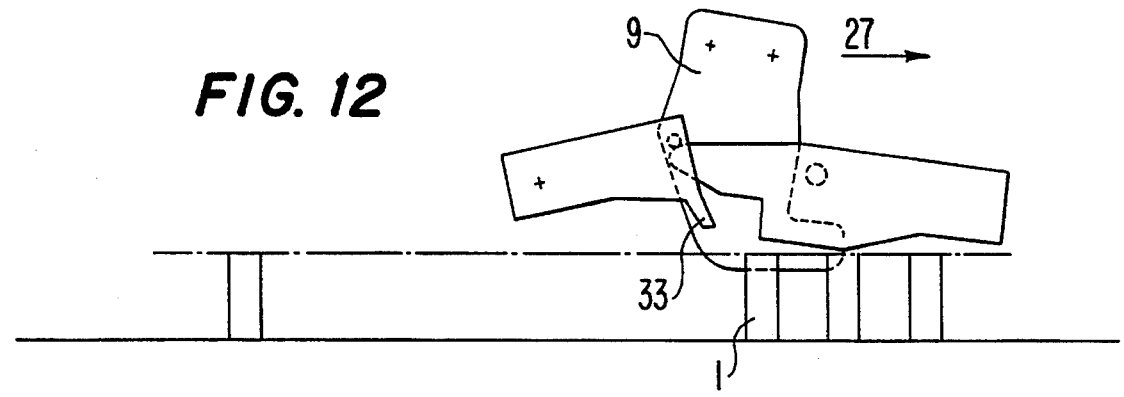

If filter plate transport drop lever 23 continues, bottom entry ramp 46 hits the filter plates of the filter plate stack 41 which is being newly formed, and drop lever 23 raises the driving pawl 21 at the end of filter plate transport so high that its driving projection 33 is above the dynamic path 40. Slide block 8 moves in the filter plate transport direction 27 by proximity switch 47 (FIG. 2) which normally initiates switching of the cable line 5 direction in the position shown in FIG. 12, after which the described procedure repeats. If slide block 8 is to be guided into its safekeeping position (FIG. 1), this is possible at any time.

The invention claimed is:

1. A filter press including a frame having a pair of upper horizontally disposed guide rails, a filter plate stack including a plurality of vertically disposed filter plates, wherein each said filter plate includes a pillow block and locking pawl at an upper end thereof for locking to an adjacent said filter plate, means for suspending the filter plates from the upper guide rails such that said filter plates are independently movable in a horizontal direction parallel to said guide rails, and a device for engaging the pillow block of and moving a front filter plate of the filter plate stack suspended on upper guide rails, the improvement comprising:

a slide block, means for movably mounting said slide block in a first direction and in a second direction opposite to the first direction along and horizontally parallel to the upper guide rails, a cable line for horizontally moving the block, a driving pawl, means for pivotally supporting one end of the driving pawl on said slide block, means defining a vertical stop on and adjacent the other end of said driving pawl, the driving pawl including forked pawl projections for engaging behind the locking pawl and pillow block of the front filter plate of the filter plate stack each time the slide block moves in the first direction for transporting the front filter plate in said first direction, the driving pawl further including a feed ramp for engaging a front of the pillow block of the front filter plate of the filter stack each time the slide block moves in the second direction, a drop lever including a movable lever end having an upwardly facing portion in contact with the stop of the driving pawl and a stop projection facing toward a front of the pillow block of the front filter plate each time the slide block moves in the second direction, means for pivotally mounting the other end of the drop lever to said block such that said movable lever end grips under the stop of said driving pawl, cam means on said drop lever for defining a cam, means defining a slide block control lever for gripping under the cam of the drop lever for raising said drop lever and said driving pawl, said control lever being attached at an upper end thereof to the cable line and being pivotable about an axle at the lower end thereof, wherein a portion of the control lever intermediate the upper and lower ends is disposed between two spaced stops provided on the block, whereby the control lever controls a positioning of the drop lever between a first lowered position during a transporting of the front filter plate in the first direction and a second raised-position during movement of the block in the second direction.

2. A device according to claim 1, wherein the locking pawl of a filter plate which is the foremost filter plate is unlocked by the driving pawl.

3. A device according to claim 1, wherein: the stops of the block control lever and the stop of the driving pawl each comprise an adjustment mechanism.

4. A device according to claim 1, wherein a spring biases stop of the driving pawl in contact the drop lever.

5. A device according to claim 1, wherein the means for movably mounting the slide block includes a pair of slide rails attached to the guide rails, and the slide block is guided along horizontally and parallel to the slide rails.

6. A device according to claim 1, wherein said means defining a block control lever includes a pair of identical block control levers, each of the identical block control levers including an offset arm and at least a portion of the drop lever is disposed between the block control levers, and wherein said cam means includes a pair of projecting cams disposed on respective sides of the drop lever which are contacted with a different one of the offset arms.

7. A device according to claim 6, wherein upper ends of the identical block control levers are connected by a cross bar, and wherein the cable line is connected to a center of the cross bar.

8. A device according to claim 1, further comprising: an overload protector to prevent an overloading of tension on the cable.

9. A device according to claim 8, wherein the overload protector includes a movable deflection pulley rotatably supporting the cable line, and a spring connected to the deflection pulley and to the device for biasing the pulley in a direction which applies tension to the cable.

* * * * *